(12) United States Patent
Higashiyama et al.

(10) Patent No.: US 10,274,014 B2
(45) Date of Patent: Apr. 30, 2019

(54) ROLLING BEARING DEVICE AND OIL SUPPLY UNIT

(71) Applicant: JTEKT CORPORATION, Osaka-shi, Osaka (JP)

(72) Inventors: Yoshimichi Higashiyama, Kashihara (JP); Masami Naka, Yamatokoriyama (JP); Tsukasa Sakazaki, Kizugawa (JP)

(73) Assignee: JTEKT CORPORATION, Osaka (JP)

( * ) Notice: Subject to any disclaimer, the term of this patent is extended or adjusted under 35 U.S.C. 154(b) by 0 days.

(21) Appl. No.: 15/816,669

(22) Filed: Nov. 17, 2017

(65) Prior Publication Data

US 2018/0149200 A1    May 31, 2018

(30) Foreign Application Priority Data

Nov. 29, 2016 (JP) .................................. 2016-230913

(51) Int. Cl.
*F16C 33/66* (2006.01)
*F16C 19/16* (2006.01)

(52) U.S. Cl.
CPC ........ *F16C 33/6659* (2013.01); *F16C 33/664* (2013.01); *F16C 19/16* (2013.01); *F16C 33/667* (2013.01); *F16C 2202/36* (2013.01)

(58) Field of Classification Search
CPC ................ F16C 33/664; F16C 33/6655; F16C 33/6659; F16C 33/6674
See application file for complete search history.

(56) References Cited

U.S. PATENT DOCUMENTS

| 7,293,919 | B2 * | 11/2007 | Ueno | .................... F04B 23/025 |
| | | | | 384/462 |
| 7,883,271 | B2 * | 2/2011 | Suzuki | ................ F16C 33/3856 |
| | | | | 384/462 |
| 2007/0071382 | A1 | 3/2007 | Suzuki | |

FOREIGN PATENT DOCUMENTS

JP       2007-092886 A     4/2007

* cited by examiner

*Primary Examiner* — James Pilkington
(74) *Attorney, Agent, or Firm* — Oliff PLC

(57) ABSTRACT

A rolling bearing device includes: a bearing portion that has an inner ring, an outer ring, a plurality of balls interposed between the inner ring and the outer ring, and a cage that holds the plurality of balls; and an oil supply unit provided adjacent to the bearing portion in the axial direction. The oil supply unit has a pump configured to supply lubricating oil to the bearing portion. The pump has a pump body provided with a nozzle that discharges lubricating oil and a vibration element that vibrates the pump body.

6 Claims, 4 Drawing Sheets

ROLLING BEARING DEVICE AND OIL SUPPLY UNIT

INCORPORATION BY REFERENCE

The disclosure of Japanese Patent Application No. 2016-230913 filed on Nov. 29, 2016 including the specification, drawings and abstract, is incorporated herein by reference in its entirety.

BACKGROUND OF THE INVENTION

1. Field of the Invention

The present invention relates to an oil supply unit that includes a pump that discharges lubricating oil, and to a rolling bearing device that includes the oil supply unit which is provided adjacent to a bearing portion.

2. Description of the Related Art

In recent years, various types of machine tools are requested to increase the speed of a main spindle in order to improve the processing efficiency and the production efficiency. When the main spindle is rotated at a high speed, the lubricating property of a bearing portion that supports the main spindle is particularly important. Thus, there is proposed a rolling bearing device in which an oil supply unit is provided adjacent to a bearing portion in the axial direction (see Japanese Patent Application Publication No. 2007-92886 (JP 2007-92886 A)). The oil supply unit has a tank that stores lubricating oil, a pump configured to supply the lubricating oil in the tank to the bearing portion, etc.

The pump of the oil supply unit described in JP 2007-92886 A is configured to cause lubricating oil to seep out of the distal end of a tubular nozzle that extends from a pump body. A pump 90 that discharges lubricating oil as oil droplets P is provided as a pump according to another embodiment as illustrated in FIG. 4. The pump 90 includes, as a nozzle 93, a minute through hole formed in a wall portion 92 of a pump body 91. The nozzle 93 opens in a side surface 94 of the wall portion 92.

The pump 90 is configured to discharge lubricating oil as the oil droplets P to a bearing portion 99 when the pump 90 is driven. Occasionally, a part of the discharged lubricating oil adheres to the side surface 94, and the lubricating oil which has adhered is gathered to cover (block) an opening of the nozzle 93. In this case, discharge of lubricating oil subsequently performed by the pump 90 may be affected. That is, if the opening of the nozzle 93 is covered by the lubricating oil which has adhered to the side surface 94, lubricating oil (oil droplets) discharged later cannot break through the covering lubricating oil, and the bearing portion 99 may not be supplied with oil appropriately. If the bearing portion 99 is not supplied with oil sufficiently, a defect such as a seizure may be caused to reduce the bearing life.

SUMMARY OF THE INVENTION

It is an object of the present invention to provide an oil supply unit configured to enable supply of oil even if a nozzle is blocked with lubricating oil and a rolling bearing device that includes the oil supply unit.

An aspect of the present invention provides a rolling bearing device including: a bearing portion that has an inner ring, an outer ring, a plurality of rolling elements interposed between the inner ring and the outer ring, and a cage that holds the plurality of rolling elements; and an oil supply unit provided adjacent to the bearing portion in an axial direction and having a pump configured to supply lubricating oil to the bearing portion, in which the pump has a pump body provided with a nozzle that discharges lubricating oil and a vibration element that vibrates the pump body.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
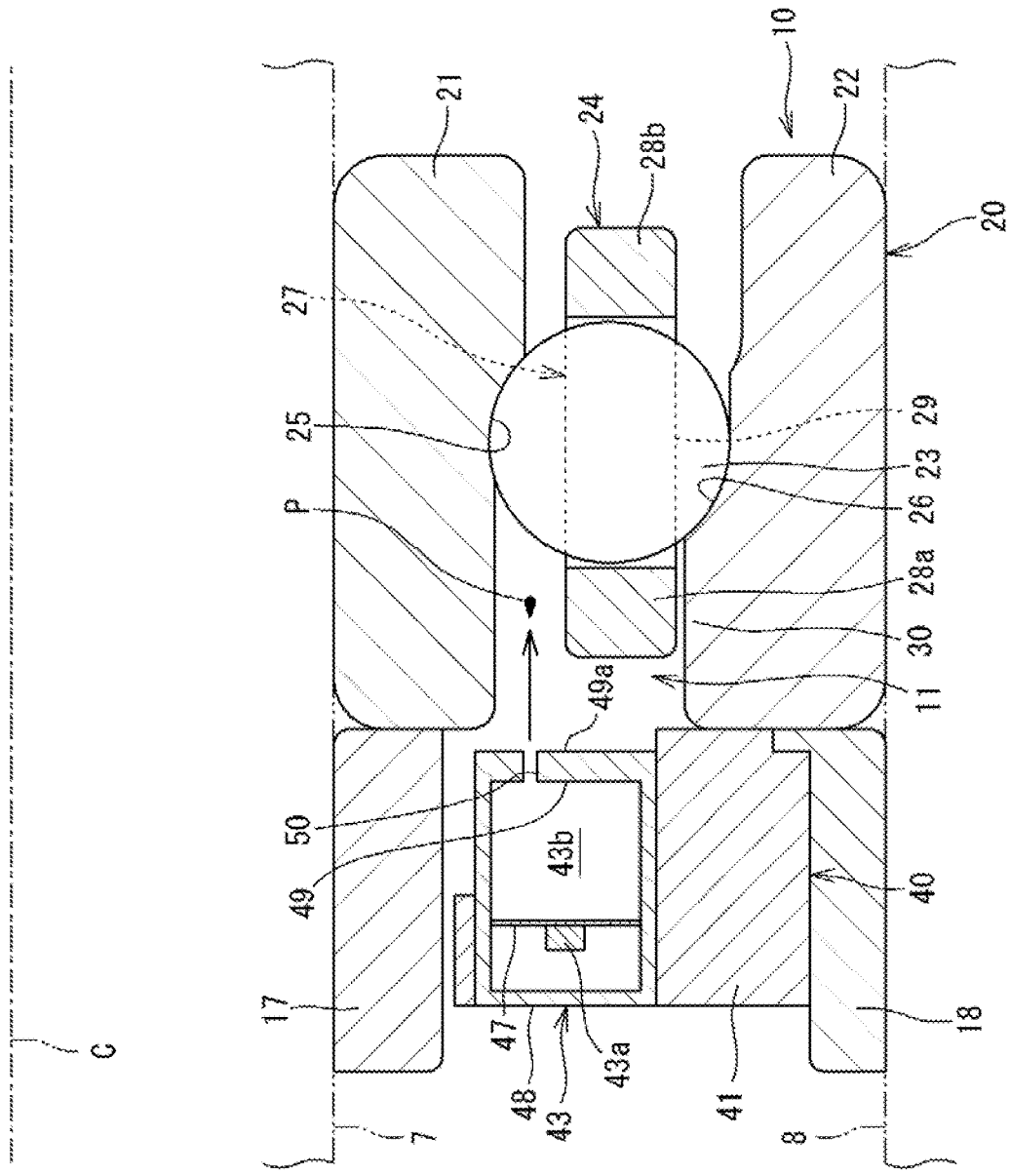
FIG. 1 is a sectional view illustrating a rolling bearing device according to an embodiment.

FIG. 1 is a sectional view illustrating a rolling bearing device according to an embodiment. A rolling bearing device 10 (hereinafter referred to also as a "bearing device 10") illustrated in FIG. 1 supports a main spindle (shaft 7) of a main spindle device of a machine tool such that the shaft 7 is rotatable, and is housed in a bearing housing 8 of the main spindle device. In FIG. 1, the shaft 7 and the bearing housing 8 are indicated by the long dashed double-short dashed lines. The bearing device 10 is also applicable to devices other than machine tools. In the following description, the direction which is parallel to a center line C of the bearing device 10 is referred to as an "axial direction", and the direction which is orthogonal to the axial direction is referred to as a "radial direction".

The bearing device 10 includes a bearing portion 20 and an oil supply unit 40. The bearing portion 20 has an inner ring 21, an outer ring 22, a plurality of balls (rolling elements) 23, and a cage 24 that holds the plurality of balls 23, and constitutes a ball bearing (rolling bearing). The bearing device 10 further includes an inner ring spacer 17 and an outer ring spacer 18 in a cylindrical shape.

The oil supply unit 40 has a circular ring shape as a whole, is attached to the radially inner side of the outer ring spacer 18, and is positioned adjacent to the bearing portion 20 in the axial direction. The oil supply unit 40 has a function of supplying oil to the bearing portion 20. The configuration and the function of the oil supply unit 40 will be described in detail later. In the embodiment, the oil supply unit 40 (body portion 41) and the outer ring spacer 18 are separate from each other. However, the oil supply unit 40 and the outer ring spacer 18 may be integral with each other. In this case, the oil supply unit 40 also has a function as an outer ring spacer, in addition to the function of supplying oil.

In the embodiment, the outer ring 22, the outer ring spacer 18, and the oil supply unit 40 are attached to the bearing housing 8 so as not to be rotatable, and the inner ring 21 and the inner ring spacer 17 are rotatable together with the shaft 7. Thus, the outer ring 22 serves as a stationary ring that is not rotatable, and the inner ring 21 serves as a rotary ring that is rotatable together with the shaft 7.

The inner ring 21 is a cylindrical member that is externally fitted with the shaft 7. A raceway (hereinafter referred to as an "inner ring raceway 25") is formed on the outer periphery of the inner ring 21. In the embodiment, the inner ring 21 and the inner ring spacer 17 are separate from each other. However, the inner ring 21 and the inner ring spacer 17 may be (inseparably) integral with each other, although not illustrated. The outer ring 22 is a cylindrical member fixed to the inner peripheral surface of the bearing housing 8. A raceway (hereinafter referred to as an "outer ring raceway 26") is formed on the inner periphery of the outer ring 22. In the embodiment, the outer ring 22 and the outer ring spacer 18 are separate from each other. However, the outer ring 22 and the outer ring spacer 18 may be (inseparably) integral with each other, although not illustrated.

The balls 23 are interposed between the inner ring 21 and the outer ring 22, and rolled on the inner ring raceway 25 and the outer ring raceway 26. The cage 24 has an annular shape, and has a plurality of pockets 27 along the circumferential direction. The balls 23 and the cage 24 are provided in an annular space 11 formed between the inner ring 21 and the outer ring 22.

The cage 24 has an annular shape as a whole, and has an annular portion 28a on one side of the balls 23 in the axial direction, an annular portion 28b on the other side of the balls 23 in the axial direction, and a plurality of cage bars 29 that couple the annular portions 28a and 28b to each other. Spaces between the annular portions 28a and 28b and between the cage bars 29 and 29 which are adjacent to each other in the circumferential direction serve as the pockets 27. One ball 23 is housed in each of the pockets 27. With this configuration, the cage 24 can hold the plurality of balls 23 at intervals in the circumferential direction.

In the cage 24, the annular portion 28a on one side (the oil supply unit 40 side) in the axial direction can be brought into slide contact with a shoulder portion 30 of the outer ring 22. Consequently, the cage 24 is positioned in the radial direction by the outer ring 22. That is, in the bearing portion 20, the cage 24 is guided by the outer ring (guided by the bearing ring).

The cage 24 is made of resin (e.g. phenol resin), for example. The inner ring 21 and the outer ring 22 are made of steel such as bearing steel. The balls 23 may be made of steel such as bearing steel, or may be made of a ceramics.

Figure 2:
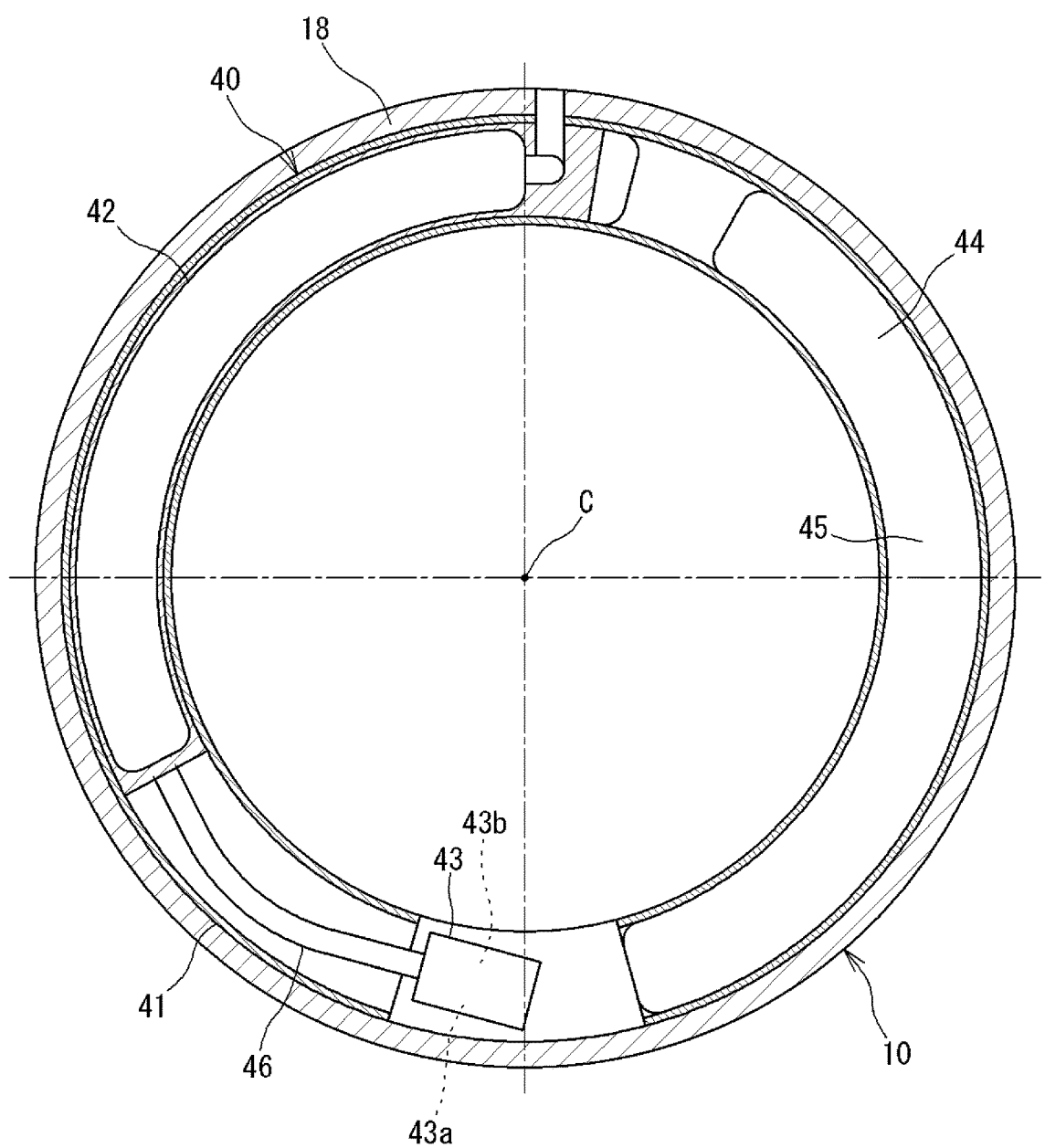
FIG. 2 is a cross-sectional view of an oil supply unit as seen in the axial direction.

FIG. 2 is a cross-sectional view of the oil supply unit 40 as seen in the axial direction. The oil supply unit 40 has a circular ring shape as a whole. The oil supply unit 40 includes a tank 42 and a pump 43. The tank 42 and the pump 43 are provided in an annular body portion 41 of the oil supply unit 40. The oil supply unit 40 includes a control portion 44 and a power source portion 45, and further includes various sensors (not illustrated).

The body portion 41 is attached to the inner peripheral side of the outer ring spacer 18, and has a function as a frame that holds the pump 43 etc. The body portion 41 is a circular ring member, and is provided with hollow spaces. The pump 43, the control portion 44, and the power source portion 45 are provided in the hollow spaces. One of the hollow spaces serves as the tank 42. Consequently, the oil supply unit 40 which includes the body portion 41, the tank 42, the pump 43, the control portion 44, the power source portion 45, etc. is constituted integrally.

In FIG. 2, the tank 42 stores lubricating oil (oil), and is connected to the pump 43 through piping 46 in order to cause the lubricating oil to flow to the pump 43. A holding material (porous member) that holds lubricating oil may be provided in the tank 42, although not illustrated.

In FIG. 1, the pump 43 has a function of supplying lubricating oil to the bearing portion 20. In order to demonstrate this function, the pump 43 has a pump body 48 provided with a nozzle (ejection port) 50 that discharges lubricating oil. The pump body 48 has an oil chamber (internal space) 43b, which is a space that is connected to the nozzle 50 and that stores lubricating oil, and a piezoelectric element 43a. An elastically deformable diaphragm 47 that constitutes a part of a wall of the oil chamber 43b is provided in the pump body 48. The piezoelectric element 43a is attached to the diaphragm 47. When a voltage is applied to the piezoelectric element 43a and the piezoelectric element 43a deforms the diaphragm 47, the volume of the oil chamber 43b is varied.

The nozzle 50 according to the embodiment is constituted of a minute through hole formed in a wall portion 49 of the pump body 48. The nozzle 50 opens in a side surface 49a of the wall portion 49. The side surface 49a in which the nozzle 50 opens faces a part of the annular space 11.

As described above, when the piezoelectric element 43a operates, the volume of the oil chamber 43b is varied, which allows lubricating oil in the oil chamber 43b to be discharged from the nozzle 50 to the annular space 11 of the bearing portion 20. In particular, when the piezoelectric element 43a operates, lubricating oil is discharged from the nozzle 50 as oil droplets P at an initial velocity. That is, the oil droplets P fly from the nozzle 50. The nozzle 50 opens toward the inner ring raceway 25 of the bearing portion 20. The oil droplets P which are discharged from the nozzle 50 can hit the balls 23, or hit the inner ring raceway 25 even if they pass through a space between the balls 23 and 23 which are adjacent to each other.

The power source portion 45 (see FIG. 2) supplies power for operation of the pump 43. The control portion 44 has a function of controlling the timing to cause the pump 43 to operate.

From the above, the pump 43 is configured to receive lubricating oil from the tank 42 in the oil chamber 43b, and to eject lubricating oil in the oil chamber 43b (cause lubricating oil in the oil chamber 43b to fly) from the nozzle 50 toward a target of the bearing portion 20 as the oil droplets P. From the viewpoint of efficient use of lubricating oil, the pump 43 ejects a determined amount of the oil droplets P in one discharge operation to cause the oil droplets P to reach the target of the bearing portion 20. Several picoliters to several nanoliters of lubricating oil are ejected from the nozzle 50 as the oil droplets P in one operation of the pump 43. In the embodiment, the target is the balls 23 and the inner ring raceway 25.

Figure 3:
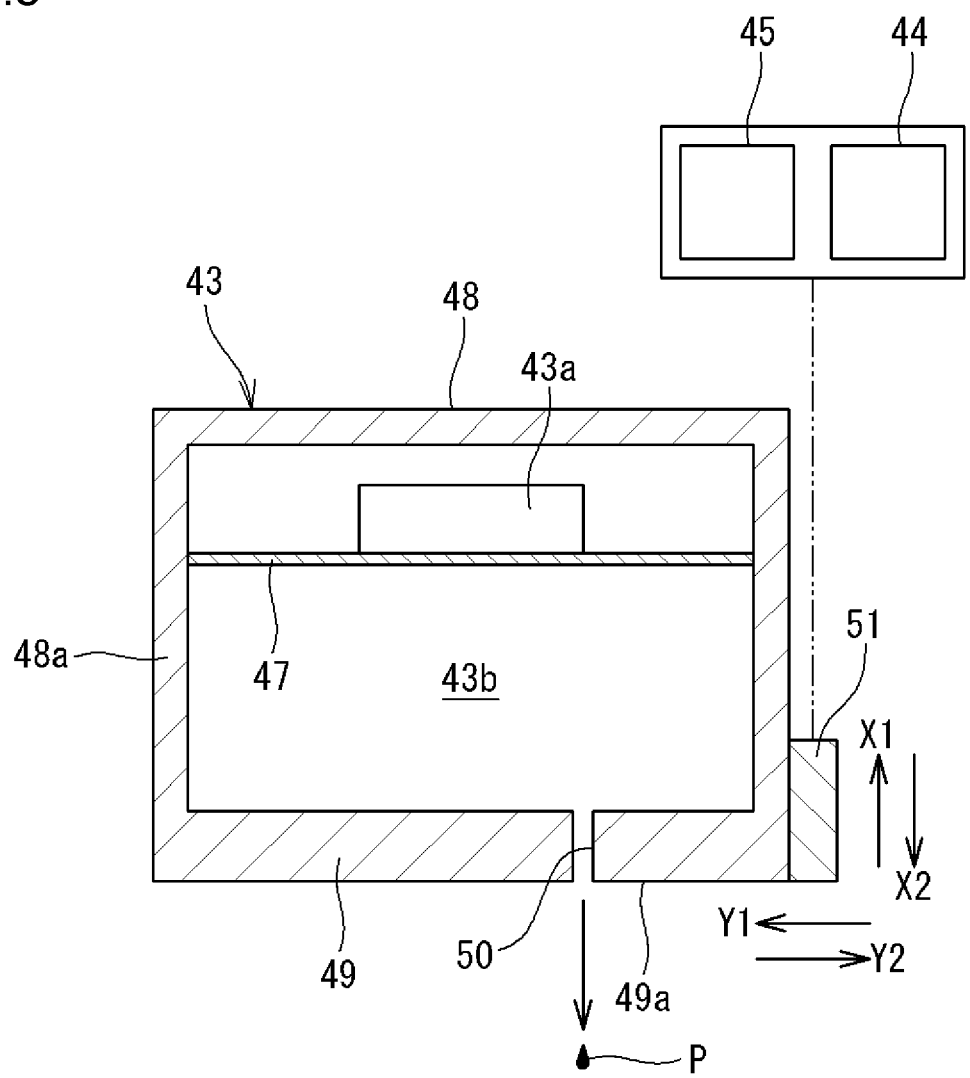
FIG. 3 is a schematic diagram illustrating a pump.
Figure 4:
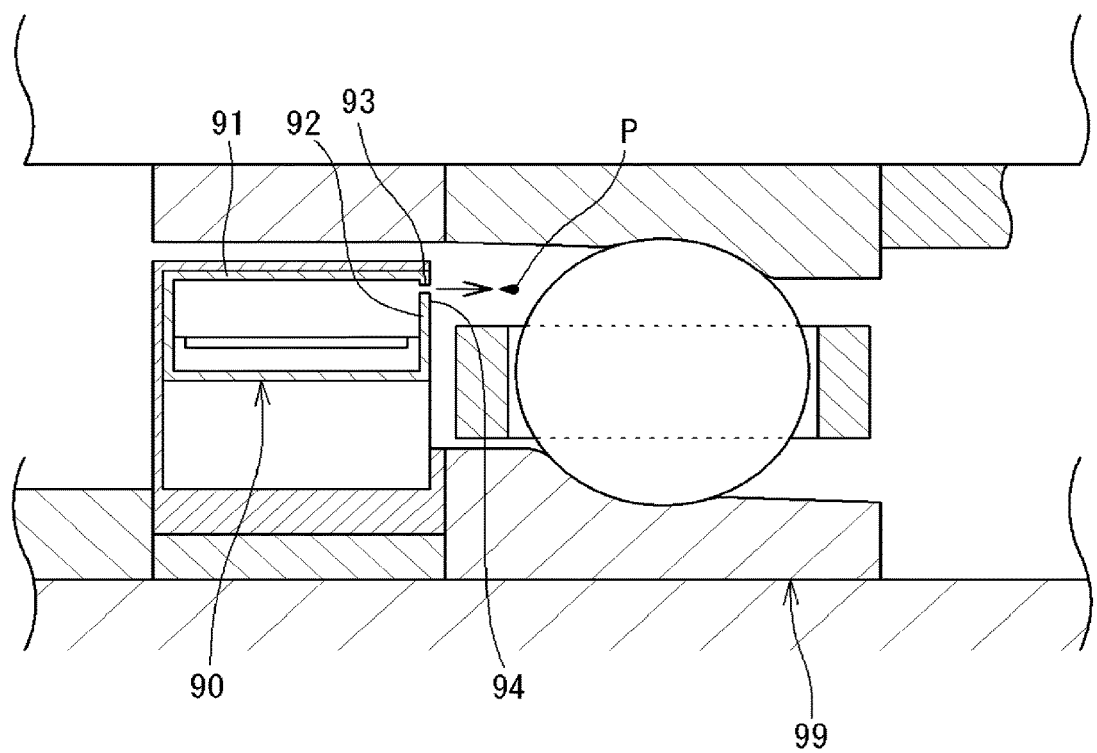
FIG. 4 is a sectional view illustrating a rolling bearing device according to the related art.

FIG. 3 is a schematic diagram illustrating the pump 43. As described above, the pump 43 includes, in addition to the pump body 48 which is provided with the nozzle 50 which discharges lubricating oil (ejects lubricating oil as the oil droplets P), a vibration element 51 that vibrates the pump body 48. The vibration element 51 is constituted by a vibration actuator that operates when an electric signal is received. The vibration element 51 can operate when power is received from the power source portion 45, and the timing etc. of operation of the vibration element 51 is controlled by the control portion 44.

The pump body 48 is configured to have a casing 48a made of a resin or metal. The oil chamber 43b is constituted inside the casing 48a. The vibration element 51 is fixed to the casing 48a. The vibration element 51 has a piezoelectric element, for example. When the piezoelectric element is vibrated, vibration is applied to the pump body 48 (casing 48a). The vibration element 51 is vibrated at a high frequency (makes ultrasonic vibration). The vibration element 51 is attached to the wall portion 49 in which the nozzle 50 is formed, or to the vicinity of the wall portion 49, of the pump body 48. In the embodiment illustrated in FIG. 3, the vibration element 51 is provided outside the casing 48a. However, the vibration element 51 may be configured to be incorporated in a part of the casing 48a. The source of vibration applied to the vibration element 51 may not be a piezoelectric element.

The direction of vibration applied to the vibration element 51 can be a direction that is orthogonal to the side surface 49a of the wall portion 49 in which the nozzle 50 opens. This direction is indicated by the arrow X1 and the arrow X2 in FIG. 3. The direction of vibration applied to the vibration element 51 may be a direction that is parallel to the side surface 49a. This direction is indicated by the arrow Y1 and the arrow Y2 in FIG. 3. The direction of vibration applied to the vibration element 51 may be a direction combined from both a component in a direction that is orthogonal to the side surface 49a and a component in a direction that is parallel to the side surface 49a.

In the rolling bearing device 10 configured as described above, the nozzle 50 of the pump 43 of the oil supply unit 40 is constituted of the through hole which is formed in the wall portion 49 of the pump body 48 as described above (see FIG. 1). The nozzle 50 opens in the side surface 49a of the wall portion 49. Therefore, if lubricating oil adheres to the side surface 49a, the lubricating oil (oil which has adhered) may block the opening of the nozzle 50.

In the embodiment, in particular, the pump 43 is configured to eject lubricating oil as the oil droplets P. Therefore, when the pump 43 operates and lubricating oil is discharged from the opening of the nozzle 50 at an initial speed, a string-like portion (hereinafter referred to as a satellite) of lubricating oil follows the leading minute oil droplets P, although not illustrated. The leading oil droplets P fly toward a part (inner ring raceway 25) of the bearing portion 20. However, the satellite, which returns toward the pump 43 because of its viscosity after being separated from the leading oil droplets P, occasionally adheres to the side surface 49a, in which the nozzle 50 opens, as oil droplets, rather than being collected into the pump 43 (oil chamber 43b).

If lubricating oil adheres to the side surface 49a in this way, the lubricating oil occasionally blocks the opening of the nozzle 50. Even in such a case, however, the vibration element 51 (see FIG. 3) vibrates the pump body 48 in order to remove the lubricating oil from the opening of the nozzle 50. The lubricating oil on the side surface 49a can be removed by separating the lubricating oil from the side surface 49a or moving the lubricating oil from the opening of the nozzle 50 using the inertial force due to the vibration.

With the vibration element 51 generating vibration (a vibration component) in a direction that is orthogonal to the side surface 49a, separation of lubricating oil that has adhered to the side surface 49a from the side surface 49a can be promoted. With the vibration element 51 generating vibration (a vibration component) in a direction that is parallel to the side surface 49a, movement of lubricating oil that has adhered to the side surface 49a along the side surface 49a can be promoted. The vibration element 51 is provided in the vicinity of the nozzle 50, and thus a portion of the wall portion 49 in the vicinity of the opening of the nozzle 50 can be vibrated efficiently to clear away lubricating oil.

The timing for the vibration element 51 to apply vibration to the pump body 48 is controlled by the control portion 44. The control portion 44 can be configured to apply vibration to the pump body 48 by actuating the vibration element 51 when adhesion of lubricating oil to the side surface 49a is detected by a sensor or the like (not illustrated), for example. Alternatively, the control portion 44 may cause the vibration element 51 to operate regularly (at predetermined time intervals) using a timer function of the control portion 44.

In FIG. 1, the side surface 49a in which the nozzle 50 opens faces a part of the annular space 11. Therefore, lubricating oil tends to adhere to the side surface 49a, and further, the lubricating oil possibly blocks the opening of the nozzle 50. In the bearing portion 20, however, when the inner ring 21 is rotated, a rotational flow of air is generated in the annular space 11 between the inner ring 21 and the outer ring 22. Consequently, lubricating oil, separation or movement of which is promoted by the vibration element 51, is easily removed from the side surface 49a utilizing this flow of air.

When the vibration element 51 vibrates the pump body 48, the adhesion of lubricating oil to the side surface 49a can be reduced by the inertial force due to the vibration, which allows removal of lubricating oil blocking the opening of the nozzle 50. Moreover, lubricating oil can be removed further reliably by additionally using the flow of air. As a result, lubricating oil discharge failure of the nozzle 50 in the pump 43 can be prevented, which makes it possible to supply oil stably to the bearing portion 20. With the oil supply unit 40 according to the embodiment, it is not necessary to perform maintenance with operation of the machine tool stopped in order to remove lubricating oil that has adhered to the nozzle 50, which makes it possible to continue operation over a long period.

In the embodiment, the frequency at which the vibration element 51 vibrates is high, and is 1 KHz or more and 3 MHz or less, for example. If the frequency of the vibration element 51 is high, lubricating oil stored in the oil chamber 43b is less likely to react to the vibration. That is, lubricating oil is less likely to follow the vibration, and separation and movement of extra lubricating oil adhering to the side surface 49a can be promoted without discharge of lubricating oil from the nozzle 50.

In the embodiment described above (see FIG. 3), the vibration element 51 is constituted of a vibration actuator, and the vibration element 51 is attached to the pump body 48. However, the piezoelectric element 43a which is configured to discharge lubricating oil from the nozzle 50 may also serve as a vibration element configured to apply vibration to the pump body 48. In this case, the piezoelectric element 43a includes a function of discharging lubricating oil from the nozzle 50 and a function of removing lubricating oil that has adhered to the side surface 49a. In the case where the piezoelectric element 43a also serves as a vibration element, the control portion 44 outputs control signals corresponding to the respective functions. That is, in order to discharge (eject) lubricating oil from the nozzle 50 as the oil droplets P, the control portion 44 applies a voltage that is similar to a single triangular wave to the piezoelectric element 43a. In order to cause the piezoelectric element 43a to function as the vibration element 51, in contrast, the control portion 44 applies a high-frequency voltage to the piezoelectric element 43a over a continuous time. Consequently, as in the embodiment described above, the pump body 48 can be vibrated, and lubricating oil that blocks the opening of the nozzle 50 can be removed.

The embodiment described above is exemplary in all respects, and not limiting. That is, the rolling bearing device according to the present invention is not limited to the illustrated embodiment, and may be in other embodiments without departing from the scope of the present invention. In the embodiment, the bearing portion 20 is an angular contact ball bearing. However, the type of the bearing is not limited thereto, and may be a deep-groove ball bearing, or may be a tapered rolling bearing or a cylindrical roller bearing. The rolling bearing device 10 may be used for usage other than a main spindle of a machine tool.

Further, the oil supply unit 40 may be used for usage other than lubrication of the bearing portion 20. For example, the oil supply unit 40 may be used for lubrication of a gear mechanism (rotary device) such as a speed reducer. That is, the oil supply unit is a device provided in a rotary device and configured to supply lubricating oil to an oil supply region of the rotary device that requires oil supply. The oil supply unit has the pump 43 which is configured to supply lubricating oil (when described with reference to FIG. 3). The pump 43 has the pump body 48 which is provided with the nozzle 50 which discharges lubricating oil (ejects lubricating oil as the oil droplets, in particular) and the vibration element 51 which vibrates the pump body 48. The various components of the oil supply unit 40 described above in relation to the embodiment can be applied to such an oil supply unit.

With the present invention, lubricating oil can be discharged from the nozzle, even if lubricating oil adheres to the opening of the nozzle or the vicinity of the opening and blocks the opening of the nozzle, when the vibration element vibrates the pump body to separate or move the lubricating oil. As a result, oil can be supplied stably.

What is claimed is:

1. A rolling bearing device comprising:
   a bearing portion that has an inner ring, an outer ring, a plurality of rolling elements interposed between the inner ring and the outer ring, and a cage that holds the plurality of rolling elements; and
   an oil supply unit provided adjacent to the bearing portion in an axial direction and having a pump configured to supply lubricating oil to the bearing portion, wherein
   the pump has a pump body provided with a nozzle that discharges lubricating oil, the pump having a piezoelectric element within the pump body and a vibration element that vibrates the pump body in order to remove the lubricating oil from an opening of the nozzle.

2. The rolling bearing device according to claim 1, wherein
   the nozzle is constituted of a through hole formed in a wall portion of the pump body, and the nozzle opens in a side surface of the wall portion.

3. The rolling bearing device according to claim 2, wherein
   the vibration element generates vibration in a direction that is orthogonal to the side surface of the wall portion.

4. The rolling bearing device according to claim 2, wherein
   the vibration element generates vibration in a direction that is parallel to the side surface of the wall portion.

5. The rolling bearing device according to claim 2, wherein
   the side surface of the wall portion is a surface that faces a part of an annular space formed between the inner ring and the outer ring of the bearing portion.

6. An oil supply unit provided in a rotary device and configured to supply lubricating oil to an oil supply region of the rotary device that requires oil supply, the oil supply unit comprising:
   a pump configured to supply lubricating oil, wherein
   the pump has a pump body provided with a nozzle that discharges lubricating oil, the pump having a piezoelectric element within the pump body and a vibration element that vibrates the pump body in order to remove the lubricating oil from an opening of the nozzle.

* * * * *